UNITED STATES PATENT OFFICE.

CHARLES AUGUSTE JANNEAU, OF PARIS, FRANCE, ASSIGNOR TO SOCIÉTÉ ANONYME DES ANCIENS ETABLISSEMENTS CHARLES JANNEAU, OF PARIS, FRANCE.

PROCESS FOR THE MANUFACTURE OF ARTICLES OF AGGLOMERATED AND REINFORCED CORK.

1,094,656.   Specification of Letters Patent.   Patented Apr. 28, 1914.

No Drawing.   Application filed April 25, 1911.   Serial No. 623,295.

*To all whom it may concern:*

Be it known that I, CHARLES AUGUSTE JANNEAU, of 73 Rue Pigalle, in the city of Paris, Republic of France, engineer, have invented a Process for the Manufacture of Articles of Agglomerated and Reinforced Cork, of which the following is a full, clear, and exact description.

It has already been proposed to provide agglomerated cork with appropriate reinforcements, but the processes heretofore known to the art have not accomplished complete adhesion between the reinforcement and the cork, so that the products obtained were, for this reason, very imperfect.

The present invention has for its object a process of manufacture by means of which an absolute adhesion between the reinforcement and the mass of agglomerated cork can be obtained.

This process essentially consists in applying on the entire surface of the reinforcement a coating composed of pitch, resin and heavy oil in determined proportions. The heavy oil used is obtained by distillation of coal. The reinforcement thus coated is then embedded in the mass of ground cork kneaded while hot with a melted mixture of pitch, resin and heavy oil, so that the coating of the reinforcement, melting slightly itself, becomes intimately combined with the agglomeration-agent of the cork. In this way a perfect adhesion between the reinforcement and the agglomerated cork is obtained.

The following proportions by weight of the products forming the composition of the coating give the best result:

| | |
|---|---|
| Pitch | 5/8 |
| Resin | 2/8 |
| Heavy oil | 1/8 |

The coating thus composed is applied while cold on to the metal reinforcement the shape and composition of which may vary, but which is always placed so as to give the product the greatest possible solidity. On the other hand, the cork, broken up in particles of variable size, according to the kind of product to be obtained, is kneaded while hot with the composition of pitch, resin and heavy oil indicated above, but previously melted and to which a fire-proofing agent may be added. The mass is worked up until the particles of cork are quite covered with the composition. The mass thus obtained is cast in a mold, of an appropriate shape, in which the reinforcement provided with its coating is placed. This mass is then compressed in the mold, either manually or by means of a hydraulic press, the degree of compression varying according to the product to be obtained. After a sufficient cooling and solidification, the worked piece is taken out of the mold and immersed in any fire-proofing agent in solution (phosphoric acid, bicarbonate of soda, etc.). After this fire-proofing agent has been dried, the worked piece is ready for use. During the molding and compression of the mass of cork, this mass causes, by reason of its temperature, a partial melting of the coating covering up the reinforcement, so that said coating becomes incorporated with the agglomeration-agent of the cork, thus assuring the adhesion of the metal of the reinforcement with the cork. Thus are obtained diverse products perfectly suitable for the use to which they are intended.

At the moment of the casting, tow or any other fibrous product may be added to the plastic mass, thus assuring the cohesion of the different parts of the product. In case of need, saw-dust could also be added to the crushed cork.

Claims:

1. The herein described process of manufacturing articles of agglomerated and reinforced cork which consists in coating the reinforcement with a mixture of pitch, resin and heavy oil, embedding the coated reinforcement in a mass of cork particles agglomerated with a heated mixture of pitch, resin and heavy oil, subjecting the mass to pressure and then allowing the compressed mass to cool.

2. The herein described process of manufacturing articles of agglomerated and reinforced cork which consists in coating the reinforcement with a mixture of pitch, resin and heavy oil in the proportions by weight of 5/8, 2/8 and 1/8, embedding the coated reinforcement in a mass of cork particles agglomerated with a heated mixture of pitch, resin and heavy oil in the same proportions, subjecting the mass to pressure and then allowing the compressed mass to cool.

5. The foregoing specification of my process for the manufacture of puggins, bricks, paving-tiles, slabs and the like, in agglomerated and reinforced cork, signed by me this 12th day of April, 1911.

CHARLES AUGUSTE JANNEAU.

Witnesses:
   H. C. COXE,
   R. CHIRIOT.